United States Patent
Duranleau-Hendrickx

(10) Patent No.: US 12,000,341 B1
(45) Date of Patent: Jun. 4, 2024

(54) METHOD FOR STARTING AN AUXILIARY POWER UNIT

(71) Applicant: PRATT & WHITNEY CANADA CORP., Longueuil (CA)

(72) Inventor: Louis Duranleau-Hendrickx, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/097,340

(22) Filed: Jan. 16, 2023

(51) Int. Cl.
*F02C 7/26* (2006.01)
*F02C 9/28* (2006.01)
*F02C 9/56* (2006.01)

(52) U.S. Cl.
CPC .............. *F02C 7/26* (2013.01); *F02C 9/28* (2013.01); *F02C 9/56* (2013.01); *F05D 2220/323* (2013.01); *F05D 2220/50* (2013.01)

(58) Field of Classification Search
CPC ......... F02C 7/26; F02C 7/262; F05D 2220/50
See application file for complete search history.

(56) References Cited

U.S. PATENT DOCUMENTS

| | | | |
|---|---|---|---|
| 5,129,221 A * | 7/1992 | Walker | F02C 9/28 60/778 |
| 5,274,996 A | 1/1994 | Goff et al. | |
| 7,168,254 B2 | 1/2007 | Riley | |
| 9,267,439 B2 | 2/2016 | Corson et al. | |
| 10,094,292 B2 | 10/2018 | Ainslie et al. | |
| 2006/0254282 A1* | 11/2006 | Riley | F02C 7/26 60/773 |
| 2010/0293961 A1* | 11/2010 | Tong | F01D 19/00 60/778 |
| 2015/0191250 A1* | 7/2015 | DeVita | B64C 27/12 701/3 |
| 2017/0016401 A1 | 1/2017 | Stockwell | |
| 2018/0128182 A1* | 5/2018 | Hayama | F02C 7/262 |
| 2020/0284200 A1* | 9/2020 | Manoukian | F02C 7/262 |

* cited by examiner

*Primary Examiner* — Katheryn A Malatek
(74) *Attorney, Agent, or Firm* — Norton Rose Fulbright Canada LLP

(57) ABSTRACT

Methods for starting an aircraft auxiliary power unit (APU) in different operating conditions are provided. A method includes performing a first start attempt on the APU when the APU is subjected to an operating condition and determining that the first start attempt was unsuccessful. The first start attempt includes delivering fuel to a combustion chamber of a combustion engine of the APU. After terminating the first start attempt, the method includes determining whether or not a change in the operating condition to which the APU is subjected is below a threshold. When the change in the operating condition is below the threshold, the method includes performing a second start attempt on the APU. The second start attempt includes delivering fuel to the combustion chamber of the combustion engine at a fuel flow rate greater than the fuel flow rate of the first start attempt.

20 Claims, 8 Drawing Sheets

| OPERATING CONDITION(S) 68 | FUEL FLOW SCHEDULES 78 | | |
|---|---|---|---|
| | START ATTEMPT 1 | START ATTEMPT 2 | START ATTEMPT 3 |
| 68A | 78A | 78B | 78C |
| 68B | 78D | 78E | 78F |
| 68C | 78G | 78H | 78I |
| ... | ... | ... | ... |

FIG. 5

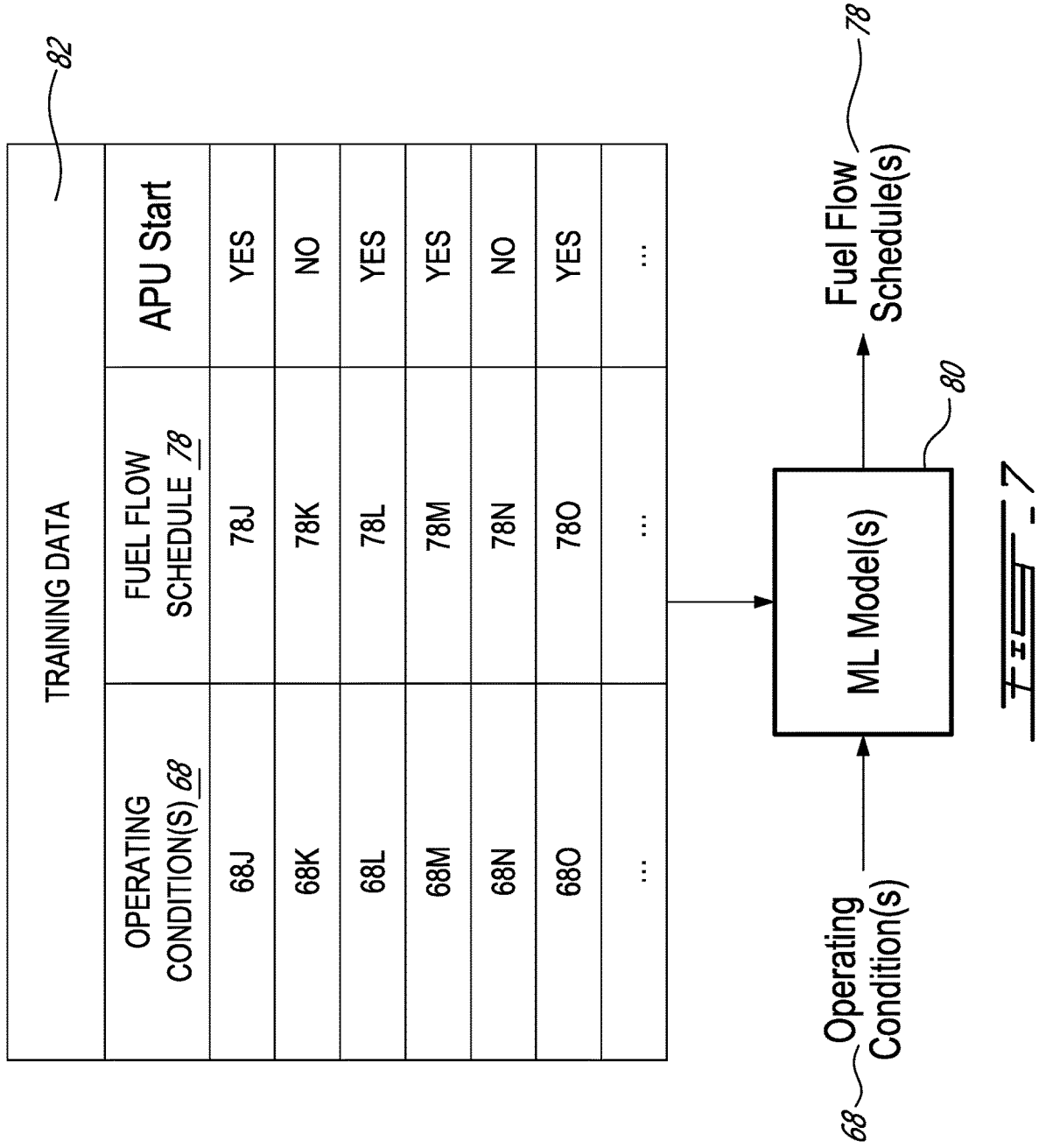

METHOD FOR STARTING AN AUXILIARY POWER UNIT

TECHNICAL FIELD

The disclosure relates generally to aircraft auxiliary power units, and more particularly to starting aircraft auxiliary power units.

BACKGROUND

In addition to their traditional propulsive functions, gas turbine engines are also used as auxiliary power units (APUs) onboard aircraft to perform non-propulsive functions such as supplying electric and/or pneumatic power to various aircraft systems. For example, power generated by the APU can be used to start the main (i.e., propulsive) engines, supply compressed air to the aircraft's environmental control system, and/or provide electric power to electric loads onboard the aircraft. APUs are mainly operated when the aircraft is on the ground and are shut off during flight of the aircraft. However, in some situations it may be desirable to start and operate the APU during flight to assist with the burden of supplying the aircraft with electric and/or pneumatic power. The selective operation of the APU on the ground and also during flight of the aircraft requires the ability to start the APU in a wide range of conditions, which can be challenging.

SUMMARY

In one aspect, the disclosure describes a method for starting an aircraft auxiliary power unit (APU) including a combustion engine. The method comprises:
  performing a first start attempt on the APU when the APU is subjected to a first operating condition, the first start attempt including delivering fuel to a combustion chamber of the combustion engine at a first fuel flow rate;
  determining that the first start attempt was unsuccessful;
  terminating the first start attempt by ceasing to deliver fuel to the combustion chamber of the combustion engine;
  determining that a difference between the first operating condition and a second operating condition to which the APU is subjected after terminating the first start attempt is below a threshold; and
  based on a determination that the difference is below the threshold, performing a second start attempt on the APU, the second start attempt including delivering fuel to the combustion chamber of the combustion engine at a second fuel flow rate that is greater than the first fuel flow rate.

In another aspect, the disclosure describes a method for starting an aircraft auxiliary power unit (APU) including a gas turbine engine. The method comprises:
  performing a first start attempt on the APU when the APU is subjected to a first operating condition, the first start attempt including delivering a first cumulative fuel amount to a combustor of the gas turbine engine during the first start attempt;
  determining that the first start attempt was unsuccessful;
  terminating the first start attempt by ceasing to deliver fuel to the combustor of the gas turbine engine; and
  when the first operating condition has not substantially changed from a second operating condition to which the APU is subjected after terminating the first start attempt, performing a second start attempt on the APU, the second start attempt including delivering a second cumulative fuel amount to the combustor of the gas turbine engine during the second start attempt, the second cumulative fuel amount being greater than first cumulative fuel amount.

In a further aspect, the disclosure describes an aircraft auxiliary power unit (APU) comprising:
  a gas turbine engine configured to provide energy exclusively for non-propulsive functions of an aircraft; and
  a controller operatively connected to the gas turbine engine and configured to:
  initiate a first start attempt on the gas turbine engine when the APU is subjected to a first operating condition, the first start attempt including delivering fuel to a combustor of the gas turbine engine at a first fuel flow rate;
  determine that the first start attempt was unsuccessful;
  terminate the first start attempt by ceasing to deliver fuel to the combustor of the gas turbine engine;
  determine that a difference between the first operating condition and a second operating condition to which the APU is subjected after terminating the first start attempt is below a threshold; and
  when the difference is below the threshold, initiate a second start attempt on the APU, the second start attempt including delivering fuel to the combustor of the gas turbine engine at a second fuel flow rate greater than the first fuel flow rate.

Further details of these and other aspects of the subject matter of this application will be apparent from the detailed description included below and the drawings.

DESCRIPTION OF THE DRAWINGS

Reference is now made to the accompanying drawings, in which:

FIG. 5 is a table defining starting protocols for starting the APU of FIG. 2;

FIG. 7 shows a table containing historical data used to train a machine learned model for determining one or more fuel flow schedules for starting the APU of FIG. 2.

DETAILED DESCRIPTION

The following disclosure describes systems and methods for starting auxiliary power units (APUs) of aircraft. Since an APU may not be operated continuously throughout an entire flight cycle of an aircraft, it may be desirable to have the ability to start and operate the APU in a wide range of operating conditions (e.g., altitudes, temperatures and aircraft speeds) in case of need. The systems and methods described herein may facilitate the light-off (i.e., successful ignition) of a combustion engine of the APU in a wide range of operating conditions to permit the selective starting and operation of the APU when the aircraft is on the ground and when the aircraft is in flight.

In some embodiments, the systems and methods described herein may make use of APU starting protocols that include fuel flow rate schedules for a plurality (e.g., two or three) start attempts for starting the APU. Following an unsuccessful start attempt, a subsequent start attempt may deliver fuel to the combustion engine of the APU at a higher fuel flow rate than that used during the preceding unsuccessful start attempt. The use of a lower baseline fuel flow rate in an initial start attempt may avoid unnecessarily delivering an excessive amount of fuel to a combustion chamber of the combustion engine and may potentially avoid causing an over-temperature condition in the combustion engine in the event of a successful light-off in some operating conditions. The starting protocols defined herein may include fuel flow rate increases between subsequent start attempts so that increasing the fuel flow rate to the combustion engine is done on an as-needed basis.

The term "connected" may include both direct connection (in which two elements contact each other) and indirect connection (in which at least one additional element is located between the two elements).

The term "substantially" as used herein may be applied to modify any quantitative representation which could permissibly vary without resulting in a change in the basic function to which it is related. For example, substantially equivalent operating (e.g., environmental, engine) conditions between subsequent APU start attempts may permissibly be somewhat different within the scope of the present disclosure if a difference in such operating conditions does not materially alter the ability to start the APU.

Aspects of various embodiments are described through reference to the drawings.

Figure 1:
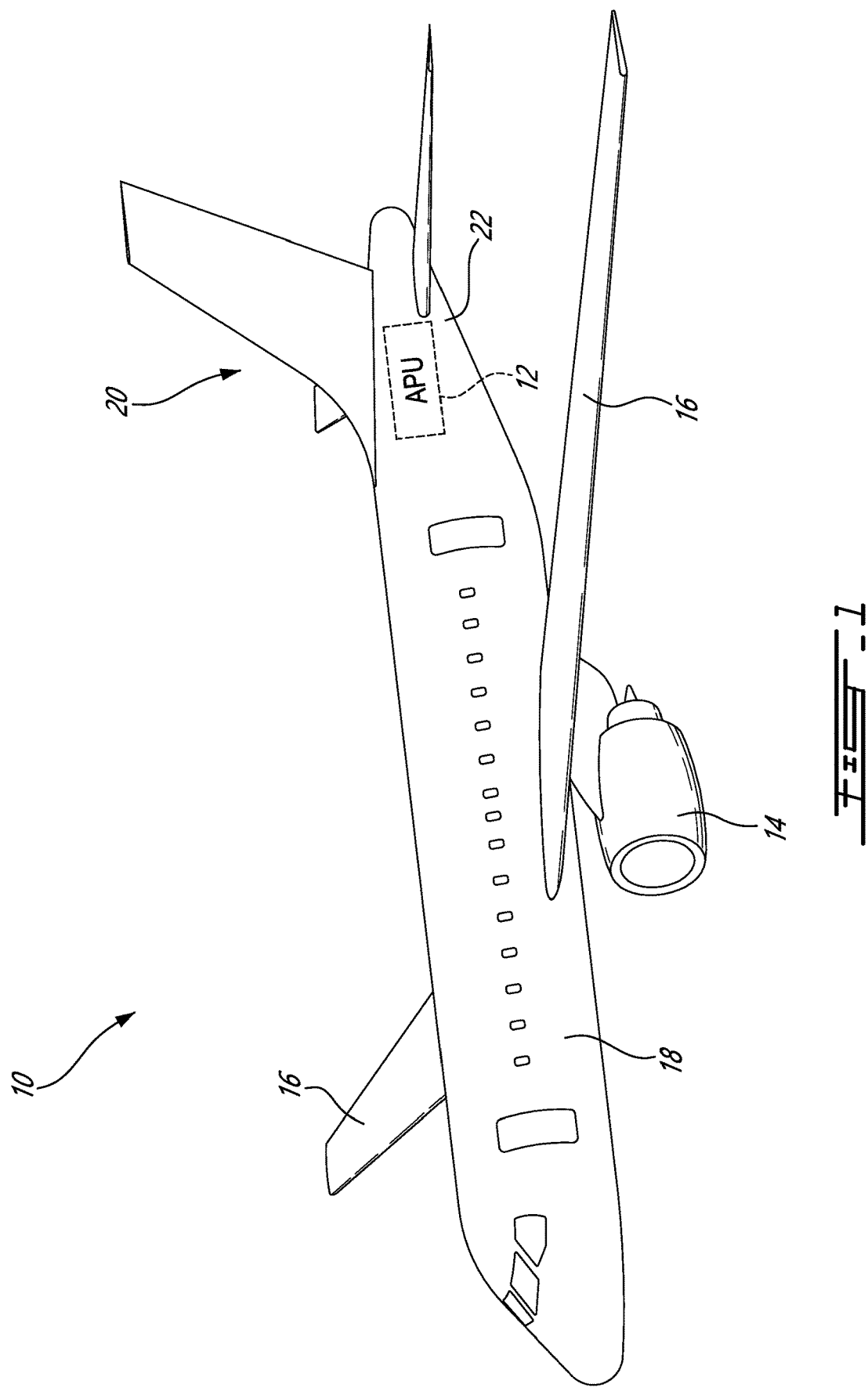
FIG. 1 is a perspective view of an exemplary aircraft including an auxiliary power unit (APU) as described herein.

FIG. 1 is a perspective view of an exemplary aircraft 10 including auxiliary power unit 12 (referred hereinafter as "APU 12") as described herein. Aircraft 10 may be a turboprop aircraft, a business jet or a commercial airliner for example. Aircraft 10 may be a fixed-wing aircraft including APU 12 for supporting non-propulsive functions of aircraft 10, and one or more main engines 14 for propelling aircraft 10. Alternatively, aircraft 10 may be a rotary wing aircraft (helicopter) including APU 12 for supporting non-propulsive functions of aircraft 10, and one or more main engines for driving one or more rotary wings of aircraft 10 for example.

In the non-limiting illustrative example, aircraft 10 may include one or more wings 16 including one or more flight control surfaces, fuselage 18 and empennage 20. Fuselage 18 may include tail cone 22 which may also be part of empennage 20. One or more of main engines 14 may be mounted to fuselage 18. Alternatively, or in addition, one or more of main engines 14 may be mounted to wings 16. APU 12 may be installed inside an aft portion of fuselage 18 such as inside tail cone 22 for example.

Figure 2:
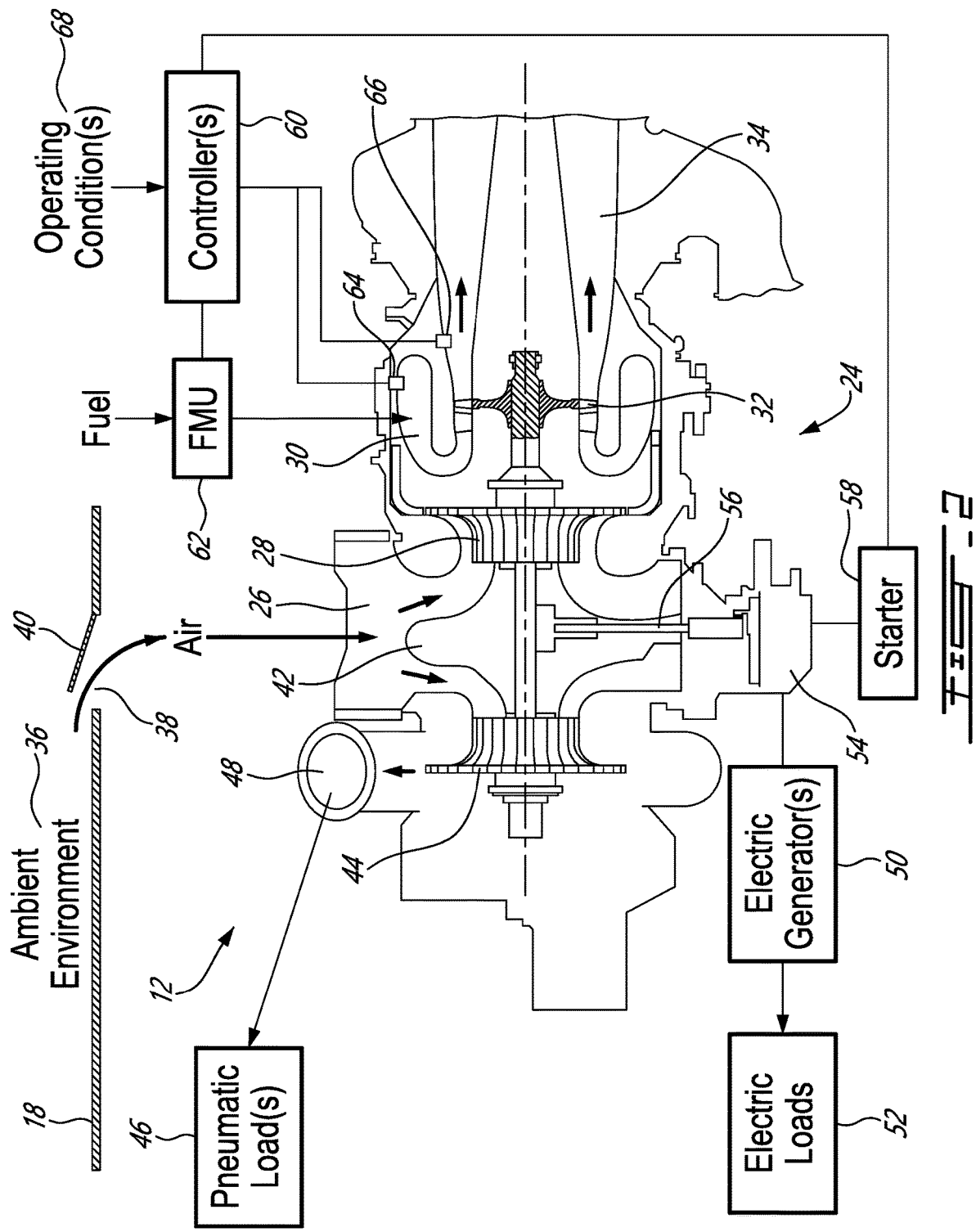
FIG. 2 is an exemplary schematic representation of the APU of FIG. 1 including an axial cross-section view of an exemplary gas turbine engine of the APU.

FIG. 2 is a schematic exemplary representation of APU 12 showing an axial cross-section view of gas turbine engine 24 (referred hereinafter as "engine 24") of APU 12. APU 12 may be a device onboard of aircraft 10 that provides energy exclusively for functions other than propulsion of aircraft 10. In other words, the purpose of APU 12 may be limited to non-propulsive functions of aircraft 10. For example, APU 12 may not produce any significant amount of lift and/or thrust for aircraft 10.

Even though APU 12 illustrated herein includes engine 24 of a gas turbine type, it is understood that the methods described herein may, in some embodiments, apply to other types of combustion (e.g., heat) engines such as rotary (e.g., Wankel) engines and piston engines for examples. In other words, the methods described herein may, in some embodiments, apply to an APU including a continuous combustion engine or an intermittent combustion engine.

Engine 24 may include, in serial flow communication, air inlet 26 via which ambient air is received, one or more engine compressors 28 for pressurizing the air, combustor 30 defining a combustion chamber and in which the compressed air is mixed with fuel and ignited for generating an annular stream of hot combustion gases, one or more turbines 32 (referred hereinafter in the singular) for extracting energy from the combustion gases, and exhaust duct 34 for conveying the combustion gases downstream of turbine 32 to the exterior of aircraft 10. The ambient air may be received from ambient environment 36 to the exterior of aircraft 10 via passage 38 extending through a skin of fuselage 18 and optionally through a suitable inlet duct extending to air inlet 26 of engine 24. Passage 38 may be also be defined by a suitable inlet scoop and/or may be selectively opened and closed by the opening or closing of actuated door 40.

Engine 24 may include flow splitter 42 for dividing the ambient air received via air inlet 26 into a first portion of air that is delivered to engine compressor 28 for supporting combustion in combustor 30 and for driving turbine 32, and into a second portion of air that is delivered to load compressor 44. Load compressor 44 may produce compressed air that is supplied to one or more pneumatic loads 46 onboard of aircraft 10. The compressed air produced by load compressor 44 may be delivered to pneumatic loads 46 via air outlet 48 and suitable conduits. Load compressor 44 may be driven by engine 24. For example, load compressor 44 may be drivingly connected to turbine 32 via one or more shafts and/or gears. In some embodiments, load compressor 44 and turbine 32 may be mounted to a common shaft and be in torque-transmitting engagement via such common shaft.

APU 12 may include electric generator 50 for producing electricity that is supplied to one or more electric loads 52 onboard of aircraft 10. Electric generator 50 may be driven by engine 24. For example, electric generator 50 may be drivingly connected to turbine 32 via one or more shafts and/or gears. In some embodiments, electric generator 50 may be drivingly connected to turbine 32 via accessory gear box 54 and tower shaft 56 for example.

APU 12 may include (e.g., electric) starter 58 that may be driven during starting of engine 24. Starter 58 may include an electric motor mounted to accessory gear box 54 and that is drivingly connected to engine compressor 28 and turbine 32 via tower shaft 56 for example. Starter 58 may be powered by a battery and the operation of starter 58 may be controlled by controller 60 that may be operatively connected to starter 58. During starting of engine 24, starter 58 may be driven to cause rotation of compressor 28 and/or of turbine 32. In some embodiments, electric generator 50 and starter 58 may be separate electric machines mounted to accessory gear box 54. Alternatively, a single electric machine such as a suitable starter/generator may perform both the electric power generation function of electric generator 50 and the starting function of starter 58.

APU 12 may include fuel metering unit 62 (referred hereinafter as "FMU 62") or other means of controlling fuel delivery to combustor 30. FMU 62 may be operatively connected to controller 60 and controlled by controller 60 to control a flow rate of fuel being delivered to combustor 30 of engine 24. In some embodiments, FMU 62 may provide fuel pumping and metering functions. FMU 62 may meter the amount of fuel being delivered to combustor 30, and dynamically alter the position of one or more valves to either increase or decrease the flow rate of fuel based on commands from controller 60.

APU 12 may include one or more igniters 64 (referred hereinafter in the singular) that may be operatively connected to controller 60 and controlled by controller 60 to selectively cause sparking inside of combustor 30 during starting of engine 24. Igniter 64 may be part of an ignition system of engine 24 and may include a suitable igniter plug operatively connected to be driven by an ignition exciter.

During a start attempt of engine 24, starter 58 may be driven to cause rotation of compressor 28 and/or turbine 32 while fuel is delivered to combustor 30 and also while igniter 64 is being driven to cause sparking inside of combustor 30. The successful (or unsuccessful) light-off may be detected (e.g., sensed) by controller 60 using one or more sensors 66. Once the successful light-off is detected, the start attempt may be brought to completion by transitioning from an open-loop control to a closed-loop control of the fuel flow into combustor 30 by controller 60 via FMU 62 to maintain combustion into combustor 30 and also to cause a suitable rotary acceleration of compressor 28 and turbine 32 to an operating, self-sustaining speed of engine 24. Bringing the start attempt to completion may include ceasing to drive starter 58 and ignitor 64. In some embodiments, the driving of starter 58 and of ignitor 64 may be ceased after the transition to closed-loop control of the fuel flow into combustor 30.

In some embodiments, the closed-loop control of the fuel flow to combustor 30 after light-off may be performed based on feedback indicative of a rotary speed and/or rotary acceleration of compressor 28, of turbine 32 and/or of a shaft drivingly connected to compressor 28 and/or turbine 32. For example, a suitable sensor such as a tachometer may be operatively connected to controller 60 and installed in engine 24 to measure such rotary speed and provide such feedback to controller 60.

The successful or unsuccessful light-off may be detected via one or more sensors 66 (referred hereinafter in the singular) operatively connected to controller 60. In some embodiments, sensor 66 may be a temperature sensor (e.g., thermocouple, resistance temperature detector) installed to sense an increase in temperature in part (i.e., combustor 30, exhaust duct 34) of engine 24 that is indicative of a successful light-off. For example, sensor 66 may be configured to sense a temperature of the exhaust gas downstream of combustor 30 so that an increase in temperature of the exhaust gas by a prescribed rise amount or to a prescribed temperature would indicate a successful light-off. Alternatively or in addition, a successful light-off could be detected by sensing an increase in rotary speed of compressor 28 and/or turbine 32, or a successful light-off could be detected by sensing an increase in pressure within a gas path of engine 24.

Controller 60 may be operatively connected to receive data indicative of one or more operating conditions 68 to which APU 12 may be subjected. Such operating conditions 68 may be acquired from sensors operatively connected to controller 60, and/or from other avionics component(s) of aircraft 10 that may be in data communication with controller 60. Operating conditions 68 may include one or more ambient/environmental parameters such as an altitude of aircraft 10 and a temperature of ambient environment 36 external of aircraft 10 for example. Alternatively or in addition, operating conditions 68 may include one or more operating parameters of engine 24 such as an air pressure at air inlet 26, a temperature of the air received at air inlet 26, a main oil temperature (MOT) of lubricating oil used in engine 24, exhaust gas temperature (EGT) and interstage turbine temperature (ITT) for example. Alternatively or in addition, operating conditions 68 may include one or more operating parameters of aircraft 10 such as a (e.g., air) speed of aircraft 10 (e.g., during flight), an amount of opening of door 40 and a state of charge of a battery that is used to drive starter 58 for example.

Figure 3:
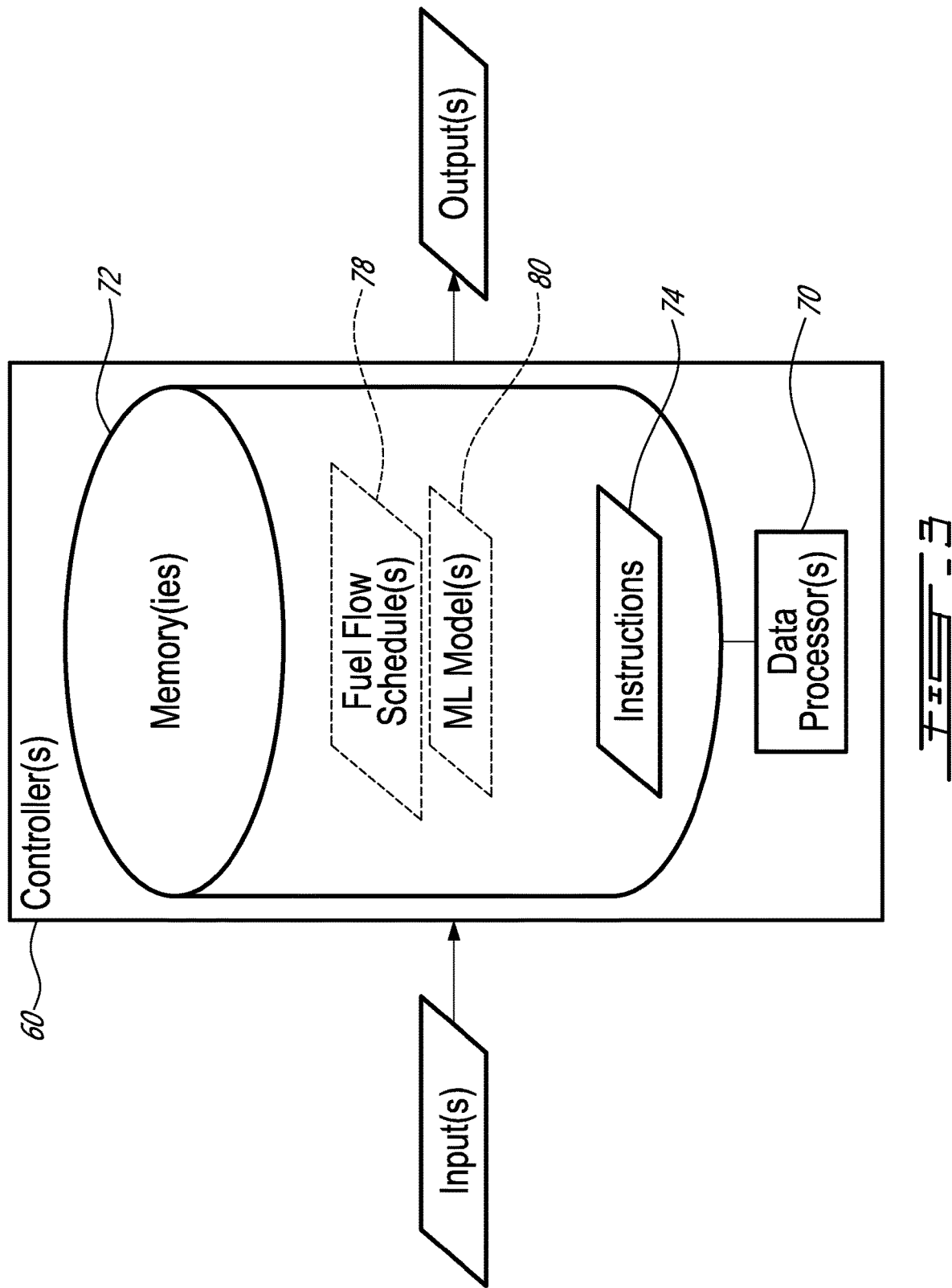
FIG. 3 is a schematic representation of an exemplary controller of the APU of FIG. 2.

FIG. 3 is a schematic exemplary representation of controller 60 of APU 12. In various embodiments, controller 60 may include or form part of a Full Authority Digital Engine Control (FADEC) of APU 12 which may, for example, include one or more digital computer(s) or other data processors, sometimes referred to as electronic engine controller(s) (EEC) and related accessories that control at least some aspects of performance of engine 24. Controller 60 may be configured to make decisions regarding the operation of engine 24 by generating outputs based on inputs (e.g., operating conditions 68) received. Controller 60 may be configured to provide tailored (e.g., optimum) engine operation based on one or more operating conditions 68. For example, controller 60 may control a servo-operated fuel valve, which may be part of FMU 62.

Controller 60 may include one or more data processors 70 (referred hereinafter in the singular as "processor 70") and one or more computer-readable memories 72 (referred hereinafter in the singular as "memory 72") storing machine-readable instructions 74 executable by processor 70 and configured to cause processor 70 to generate one or more outputs (e.g., signals) for causing the execution of steps of the methods described herein. Controller 60 may carry out additional functions than those described herein.

Processor 70 may include any suitable device(s) configured to cause a series of steps to be performed by controller 60 so as to implement a computer-implemented process such that instructions 74, when executed by controller 60, may cause the functions/acts specified in the methods described herein to be executed. Processor 70 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 72 may include any suitable machine-readable storage medium. Memory 72 may include non-transitory computer readable storage medium such as, for example, but not limited to, an electronic, magnetic, optical, electromagnetic, infrared, or semiconductor system, apparatus, or device, or any suitable combination of the foregoing. Memory 72 may include any storage means (e.g., devices) suitable for retrievably storing machine-readable instructions 74 executable by processor 70.

Various aspects of the present disclosure may be embodied as systems, devices, methods and/or computer program products. Accordingly, aspects of the present disclosure may take the form of an entirely hardware embodiment, an entirely software embodiment or an embodiment combining software and hardware aspects. Aspects of the present disclosure may take the form of a computer program product embodied in one or more non-transitory computer readable medium(ia) (e.g., memory 72) having computer readable program code (e.g., instructions 74) embodied thereon. Computer program code for implementing aspects of the methods disclosed herein in accordance with instructions 74 may be written in any combination of one or more programming languages based on the present disclosure.

Memory 72 may also store one or more starting schedules 78 for use by controller 60 when starting engine 24 of APU 12. Starting schedules 78 may define fuel flow rates to use when delivering fuel to combustor 30 during one or more start attempts. Memory 72 may also store one or more other parameters for use by controller 60 when starting engine 24. Such other parameters may be associated with controlling the operation of starter 58 and/or of igniter 64 (e.g., sparking rate) during start attempts. In some embodiments, schedules 78 may be stored in the form of one or more look-up tables. Alternatively or in addition, applicable fuel flow rates may be determined by controller 60 using one or more machine learned (ML) models 80 (referred hereinafter in the singular).

Figure 4:
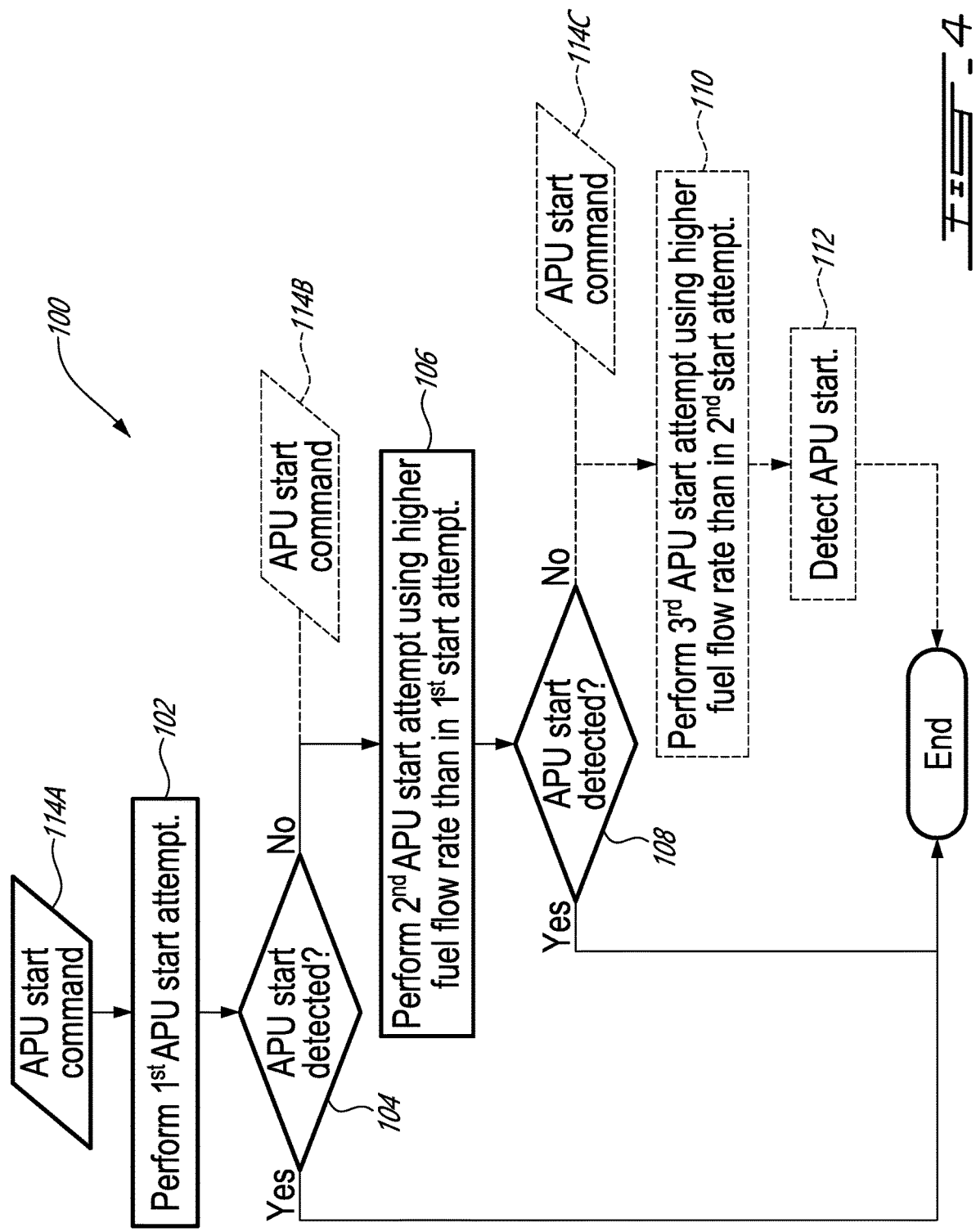
FIG. 4 is a flow diagram illustrating an exemplary method for starting the APU of FIG. 2.

FIG. 4 is a flow diagram illustrating an exemplary method 100 for starting engine 24 of APU 12. Method 100 may be performed using APU 12 described herein or using other APU(s). For example, instructions 74 may be configured to cause controller 60 to perform at least part of method 100. It is understood that aspects of method 100 may include other actions disclosed herein and/or may include elements of APU 12. In various embodiments, method 100 may include:

performing a first start attempt on APU 12 when APU 12 is subjected to a first operating condition, the first start attempt including delivering fuel to a combustion chamber defined by combustor 30 of engine 24 at a first fuel flow rate (block 102);

determining that the first start attempt was unsuccessful at decision block 104;

terminating the first start attempt by ceasing to deliver fuel to the combustion chamber defined by combustor 30 of engine 24;

determining that a difference between the first operating condition and a second operating condition to which APU 12 is subjected after terminating the first start attempt is below a threshold; and based on a determination that the difference is below the threshold, performing a second start attempt on APU 12, the second start attempt including delivering fuel to the combustion chamber defined by combustor 30 of engine 24 at a second fuel flow rate that is greater than the first fuel flow rate (block 106).

Method 100 may allow for two or more start attempts at obtaining a successful start of APU 12 (e.g., successful light-off of engine 24) across the envisioned operation envelope of aircraft 10. In some embodiments, method 100 may provide up to three consecutive attempts at obtaining a successful start of APU 12 within a prescribed time frame. For example, following two consecutive unsuccessful start attempts, method 100 may provide a third start attempt. Accordingly, method 100 may include:

determining that the second start attempt was unsuccessful at decision block 108;

terminating the second start attempt by ceasing to deliver fuel to the combustion chamber defined by combustor 30 of engine 24; and performing a third start attempt on APU 12, the third start attempt including delivering fuel to the combustion chamber defined by combustor 30 of engine 24 at a third fuel flow rate greater than the second fuel flow rate.

In some embodiments, during first, second and/or third start attempts, the fuel delivery to combustor 30 may be controlled in an open-loop manner so that the fuel rate(s) used during the start attempts are from predetermined fuel flow schedules 78 that are pre-set for each start attempt. Accordingly, the fuel flow rate(s) used in the open-loop manner during the start attempts are not varied to provide a self-correcting action based on feedback received at controller 60 (as there otherwise would be in a closed-loop control scheme). In other words, feedback received at controller 60 is not used to alter the fuel flow rate(s) during the respective start attempt.

At decision block 104, if a successful light-off is detected to indicate a successful start of APU 12 during the first start attempt, then the first start attempt would be brought to completion and the second start attempt would not be required. Similarly, at decision block 108, if a successful light-off is detected to indicate a successful start of APU 12 during the second start attempt, then the second start attempt would be brought to completion and the third start attempts would not be required. Block 112 indicates the detection of a successful start of APU 12 during the third start attempt. When a successful light-off is detected (e.g., via sensor 66 or otherwise) during a start attempt, the current start attempt may be brought to completion by transitioning from open-loop control to closed-loop control of the fuel flow to combustor 30 so that controller 60 may then take engine 24 to an operating, self-sustaining speed based on feedback received at controller 60. The completion of a successful start attempt may also include ceasing to drive starter 58 and igniter 64.

In some embodiments, method 100 may include the receipt of one or more APU start commands 114A-114C that may be used by controller 60 to initiate one or more respective start attempts. One or more of APU start commands 114A-114C may be received by controller 60 from a pilot of aircraft 10 via a suitable user interface (e.g., button, switch) on a flight deck of aircraft 10 for example. Accordingly, one or more of the start attempts may be manually commanded by the pilot. Alternatively, one or more of APU start commands 114A-114C may be generated automatically by a system of aircraft 10 and communicated to controller 60, or generated automatically within controller 60, in response to a sensed condition indicating a need for APU 12 to be started and operated. For example, such sensed condition may include a non-normal condition of main engine 14 resulting in a need for assistance from APU 12 with the burden of supplying aircraft 10 with electric and/or pneumatic power. In response to such APU start command(s) 114A-114C, controller 60 may then generate a suitable output to initiate one or more start attempts using the appropriate fuel flow schedule(s) 78. In some embodiments, first APU start command 114A may be received to initiate the first start attempt and the subsequent second and third start attempts may be automatically initiated by controller 60 and carried out only if needed when the first and second start attempts are unsuccessful (i.e., successful light-off is not detected). In other words, APU start command(s) 114B and 114C may not be required to initiate the second and third start attempts in some embodiments of method 100.

Aspects of method 100 are described below in reference to FIGS. 5-7.

FIG. 5 is an exemplary look-up table defining fuel flow rate schedules 78 that may be used by controller 60 to initiate and carry out start attempts on APU 12. In some embodiments, schedules 78 may be predetermined and stored in memory 72 in the form of a look-up table. In various embodiments, a single set of fuel flow schedules 78 may be used, or a plurality of sets of fuel flow schedules 78 may be available and selected by controller 60 based on one or more operating conditions 68A-68C.

The different fuel flow schedules 78 may be tailored to the applicable operating condition(s) 68 and start attempt to provided greater (e.g., optimum) likelihood of a successful APU start under the applicable operating condition(s) 68. In some situations, a failed start attempt in relatively cold ambient temperatures and/or at high altitudes may be due to a fail-to-light issue with engine 24. One way to overcome such fail-to-light issue in an initial start attempt may be to increase the open-loop fuel flow rate during a subsequent start attempt. The use of increased fuel flow rate to achieve light-off may be undesirable in some conditions so this approach may not be suitable universally for all start attempts and all operating conditions 68. For example, the use of excessive fuel flow to achieve light-off in some operating conditions 68 could result in EGT and/or ITT exceedances depending on the deteriorations state of engine 24.

For example, it may be desirable to use a baseline nominal fuel flow rate according to fuel flow schedule 78A in an initial start attempt where the nominal flow rate is expected to result in a successful start of APU 12 in the applicable operating condition(s) 68A without causing a EGT and/or ITT exceedance(s). In the event where the first start attempt is not successful, a subsequent second start attempt may be carried out using a higher fuel flow rate according to fuel flow schedule 78B. Similarly, in the event where the second start attempt is not successful, a subsequent third start attempt may be carried out using an even higher fuel flow rate according to fuel flow schedule 78C. FIG. 5 also shows three fuel flow schedules 78D-78F for three respective start attempts associated with operating condition(s) 68B, and three fuel flow schedules 78G-78I for three respective start attempts associated with operating condition(s) 68C. Accordingly, the applicable set of fuel flow schedules 78 may be selected by controller 60 based on the applicable operating condition(s) 68.

In some embodiments, fuel schedules 78A, 78D, 78G for the first start attempt may be condition-specific and may differ as a function of operating condition(s) 68. Alternatively, fuel schedules 78A, 78D, 78G for the first start attempt may be substantially identical and universally used in all operating conditions. For example, fuel schedules 78A, 78D, 78G may include a baseline nominal fuel flow rate that is expected to result in a successful start of APU 12 in some operating condition(s) 68. In the event of an unsuccessful first start attempt, method 100 may then use a condition-specific fuel schedule 78B, 78C, 78E, 78F, 78H, 78I for the second start attempt and/or for the third start attempt if required.

The applicable operating condition(s) 68 may define one or more ranges of values indicative of the applicable operating condition(s) 68. In various embodiments, operating condition(s) 68 may include a sole operating condition 68 or a combination of a plurality of operating conditions 68. In some embodiments, operating condition(s) 68 may include the altitude of aircraft 10 including APU 12. In some embodiments, operating condition(s) 68 may include the temperature of the ambient environment external of aircraft 10 including APU 12. In some embodiments, operating condition(s) 68 may include a (e.g., air) speed of aircraft 10 including APU 12 during flight of aircraft 10.

Each set of fuel flow schedules 78 such as first set (78A, 78B, 78C), second set (78D, 78E, 78F) and third set (78G, 78H, 78I) of fuel flow schedules 78 may each be applicable to specific operating conditions 68. For example, in the event that the same operating conditions 68A remain applicable for all three start attempts or would not substantially change between the three start attempts, fuel flow schedules 78A, 78B, 78C would be used. However, in the event where operating condition(s) 68 would significantly change between start attempts, subsequent start attempts may switch to a different set of fuel flow schedules 78 that is associated with the newly applicable operating condition(s) 68. In some embodiments, switching to a different set of fuel flow schedules 78 would also include starting from the first start attempt of the applicable set of fuel flow schedules 78. For example, in the event of a change from operating condition 68A to operating condition 68B after unsuccessfully completing a second start attempt using fuel flow schedule 78B, a subsequent start attempt may then use fuel flow schedule 78D associated with the first start attempt under the newly applicable operating condition 68B.

Determining whether operating condition(s) 68 has/have substantially changed may be done by comparing one or more changes in operating condition(s) 68 to one or more respective thresholds. For example, if a change in a particular operating condition 68 to which APU 12 is subjected is below an applicable threshold, it may be determined that the particular operating condition 68 has not substantially changed. For example, if the altitude of aircraft 10 has not changed by more than 2000 feet, it may be determined that for the purpose of starting APU 12, the altitude of aircraft 10 has not substantially changed. For example, if the ambient temperature outside of aircraft 10 has not changed by more than 5° C., it may be determined that for the purpose of starting APU 12, the ambient temperature has not substantially changed.

In some embodiments, instead of measuring/sensing operating condition(s) 68 and/or evaluating operating condition(s) 68 directly, controller 60 may use a timer to evaluate a duration between start attempts to indirectly determine whether or not operating condition(s) 68 have substantially changed. For example, if the duration between successive start attempts is relatively short, controller 60 may infer that operating condition(s) 68 has/have not substantially changed to materially affect the ability to start APU 12 (i.e., the difference between the first operating condition of the first start attempt and the second operating condition of the second start attempt is below the threshold). In other words the first and second operating conditions referenced in method 100 may be considered to fall under the same operating condition 68A. For example, performing the second start attempt associated with operating condition 68A may be conditional upon a prescribed duration since terminating the first start attempt not having expired. In other words, performing the second start attempt associated with operating condition 68A may be conditional upon a time duration since terminating the first start attempt being less than a threshold time. Accordingly, method 100 may include determining that the time duration (e.g., D1 shown in FIG. 6A) since terminating the first start attempt is less than the threshold time.

Similarly, performing the third start attempt associated with operating condition 68A may be conditional upon the same or other prescribed duration since terminating the second start attempt not having expired. Accordingly, method 100 may include determining that the time duration (e.g., D2 shown in FIG. 6A) since terminating the second start attempt is less than the same or other threshold time. In some embodiments, such prescribed duration (or threshold time) may be about 30 seconds. For example, determining (e.g., inferring) that the change in a particular operating condition 68 to which APU 12 subjected is below an applicable threshold may be done by determining that the prescribed duration since terminating the preceding (e.g., first or second) start attempt has not expired. In other words, determining (e.g., inferring) that the change in the particular operating condition to which APU 12 subjected is below the threshold may be done by determining that a time since a termination of the preceding (e.g., first or second) start attempt was less than or equal to 30 seconds.

Figure 6A:
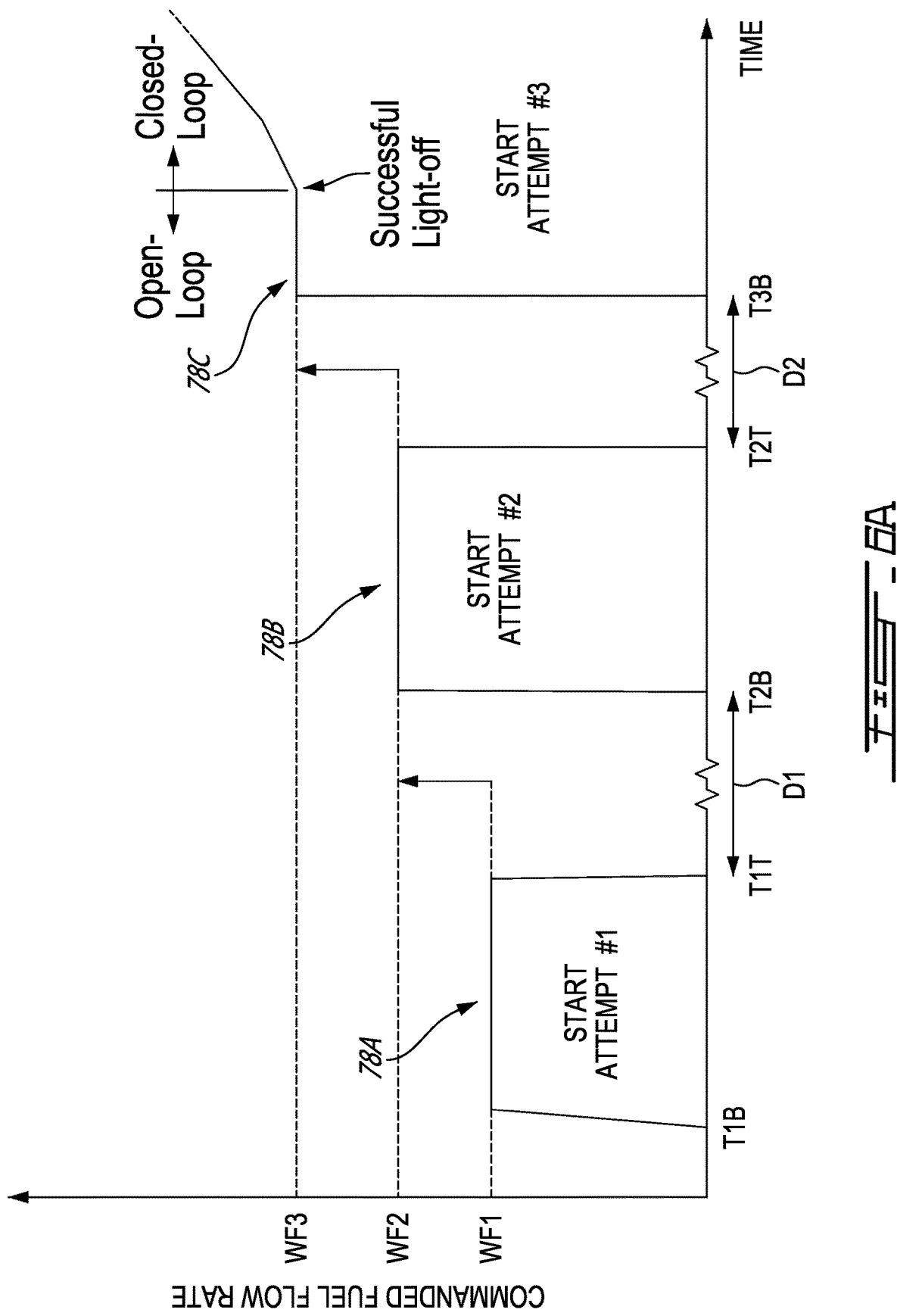
FIG. 6A is a plot of a commanded fuel flow rate as a function of time for an exemplary protocol for starting the APU of FIG. 2.

In some embodiments, fuel flow schedules 78 may each be defined by a sole value (e.g., maximum fuel flow rate, average fuel flow rate, cumulative fuel amount (e.g., weight, volume)) to be used by controller 60 in a predefined standard fuel delivery profile (e.g., as shown in FIG. 6A) of a predetermined shape and duration. Such standard fuel delivery profile may include a first segment defining an increase in fuel flow rate to combustor 30, a second segment defining a plateau at a maximum fuel flow rate and a third segment defining a termination of fuel delivery to combustor 30 in the event of an unsuccessful start attempt. In some embodiments, one or more fuel flow schedules 78 may be more complex and may include one or more profiles that define a desired variation of the fuel flow rate with respect to time. For example, one or more fuel flow schedules 78 may include linear and or curved segments including one or more ramps, one or more plateaus, one or more step increases/decreases, and/or combinations thereof. Desirable fuel flow schedules 78 for a specific engine and for applicable operating condition(s) 68 may be determined empirically and/or by simulation/modelling. Alternatively or in addition, desirable fuel flow schedules 78 may be determined using machine learning as explained below.

FIG. 6A is a plot of a commanded fuel flow rate (e.g., weight/time, volume/time) of fuel delivered to combustor 30 of engine 24 as a function of time for an exemplary protocol for starting APU 12. FIG. 6A graphically illustrates three consecutive start attempts using fuel flow schedules 78A, 78B and 78C respectively, which are associated with operating condition(s) 68A in FIG. 5. FIG. 6A shows the first and second start attempts as being unsuccessful. A successful light-off is indicated to occur during the third start attempt. The fuel flow rate may be controlled in an open-loop manner until the light-off is detected. Once the light-off is detected, the fuel flow rate may be controlled in a closed-loop manner.

Fuel flow schedule 78A of the first start attempt may define a maximum fuel flow rate WF1 that is achieved during the first start attempt. The first start attempt may be preceded by a relative high fuel flow rate being commanded for a relatively short time to fill one or more manifolds or other fuel lines of the fuel system in preparation for delivering fuel to combustor 30. Maximum fuel flow rate WF1 may define an initial or sole plateau of fuel flow schedule 78A. The first start attempt may begin at time T1B and terminate at time T1T. Fuel flow schedule 78B of the second start attempt may define a maximum fuel flow rate WF2 that is achieved during the second start attempt. Maximum fuel flow rate WF2 may define an initial or sole plateau of fuel flow schedule 78B. The second start attempt may begin at time T2B following first time duration D1=T2B-T1T since the termination of the first start attempt and terminate at time T2T. First time duration D1 may be sufficiently short (e.g., less than or equal to 30 seconds) to indicate that operating condition(s) 68 has/have not substantially changed between the first start attempt and the second start attempt. In some examples, first time duration D1 and second time duration D2 may each include a length of time sufficient to evacuate fuel from the combustor 30 of the APU 12 by driving starter 58. Fuel flow schedule 78C of the third start attempt may define a maximum fuel flow rate WF3 that is achieved during the third start attempt. Maximum fuel flow rate WF3 may define an initial or sole plateau of fuel flow schedule 78C. The third start attempt may begin at time T3B following second time duration D2=T3B-T2T since the termination of the second start attempt. Second time duration D2 may be sufficiently short (e.g., less than or equal to 30 seconds) to indicate that operating condition(s) 68 has/have not substantially changed between the second start attempt and the third start attempt. The maximum allowable time durations D1 and D2 between attempts may be the same or different in various embodiments.

As shown in FIG. 6A, the fuel flow rate of fuel delivered to combustor 30 may be increased for substantially an entire subsequent start attempt following an unsuccessful start attempt. For example, maximum fuel flow rate WF2 of the second start attempt may be greater than maximum fuel flow rate WF1 of the first start attempt so that WF2>WF1. For example, maximum fuel flow rate WF2 may be increased by a fixed amount (e.g., +10 pounds per hour) or by a percentage (e.g., +5%) over maximum fuel flow rate WF1. Similarly, maximum fuel flow rate WF3 of the third start attempt may be greater than maximum fuel flow rate WF2 of the second start attempt so that WF3>WF2. For example, maximum fuel flow rate WF3 may be increased by a fixed amount (e.g., +10 pounds per hour) or by a percentage (e.g., +5%) over maximum fuel flow rate WF2. In various embodiments the first increase from maximum fuel flow rate WF1 to maximum fuel flow rate WF2 may be the same as or different from the second increase from maximum fuel flow rate WF2 to maximum fuel flow rate WF3.

As shown by the shape of the plot in FIG. 6A also, an average fuel flow rate of fuel delivered to combustor 30 during the second unsuccessful start attempt may be greater than an average fuel flow rate of fuel delivered to combustor 30 during the first unsuccessful start attempt.

As represented by the area under the plot in FIG. 6A, a cumulative amount (e.g., pounds, litres) of fuel delivered to combustor 30 during the second start attempt may be greater than a cumulative amount of fuel delivered to combustor 30 during the first start attempt.

Each unsuccessful start attempt may be terminated after some predetermined time period (e.g., about 30 seconds). Terminating an unsuccessful start attempt may include ceasing to deliver fuel to combustor 30 of engine 24, evacuate excess fuel from combustor 30, ceasing to drive starter 58 and ceasing to drive igniter 64. Ceasing to drive starter 58 may prevent overheating of starter 58 and permit the cooling of starter 58 during a pause defined by duration D1 and/or a pause defined by duration D2. Ceasing to deliver fuel to combustor 30 between start attempts may prevent the accumulation of an excessive amount of fuel in combustor 30 and may potentially prevent EGT and/or ITT exceedance(s). For example, pausing fuel delivery to combustor 30 between start attempts may allow residual fuel to be evacuated from combustor 30 by the flow of air driven through combustor 30 by compressor 28 and turbine 32 by driving starter 54 during some of duration D1 and/or duration D2. Ceasing to deliver fuel to combustor 30 between start attempts may potentially also prevent combustion outside of the combustion chamber (also known as "torching") if light-off is obtained in a subsequent attempt.

Figure 6B:
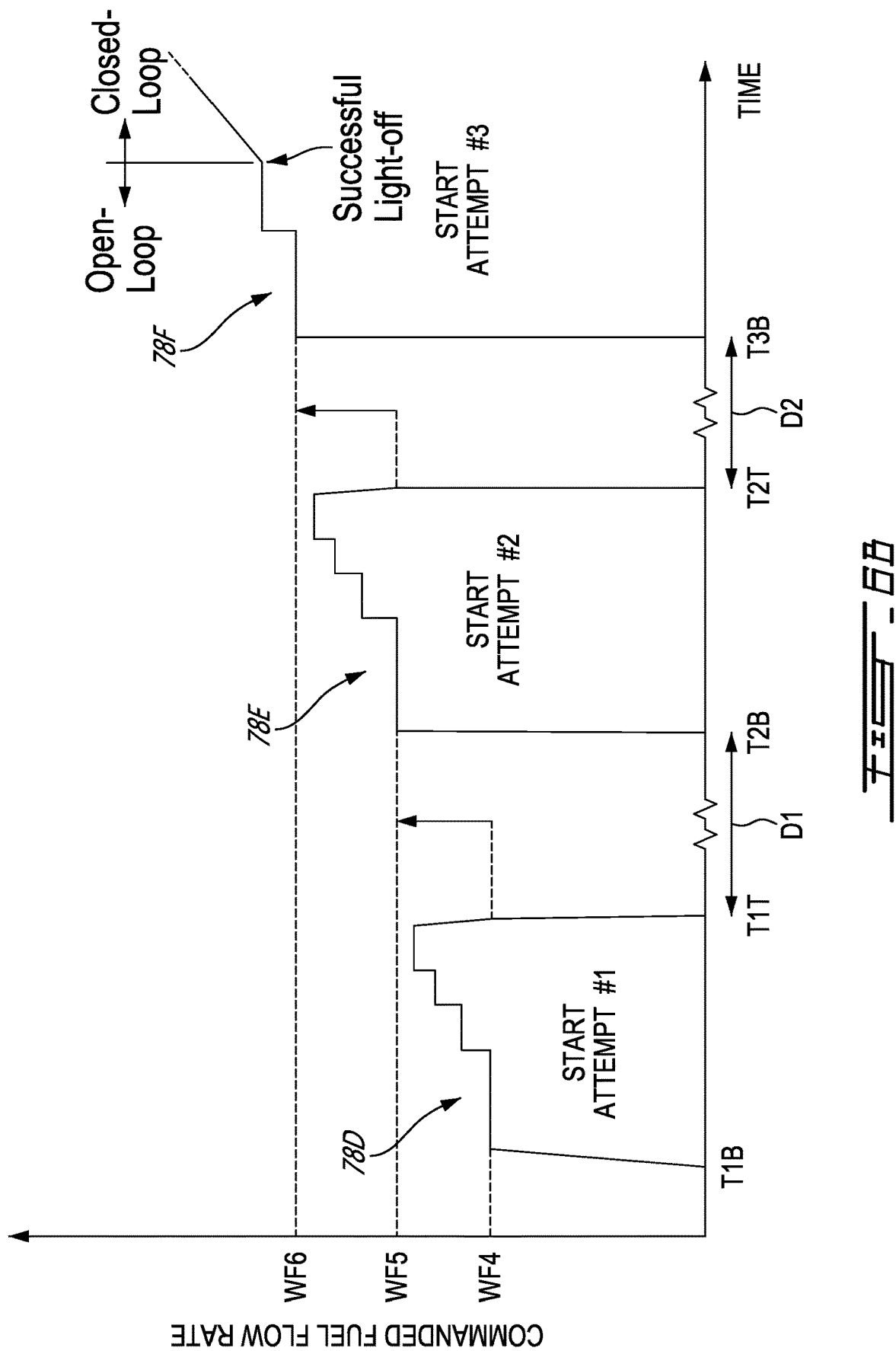
FIG. 6B is a plot of a commanded fuel flow rate as a function of time for another exemplary protocol for starting the APU of FIG. 2.

FIG. 6B is a plot of a commanded fuel flow rate (e.g., weight/time, volume/time) of fuel delivered to combustor 30 of engine 24 as a function of time for another exemplary protocol for starting APU 12. FIG. 6B graphically illustrates three consecutive start attempts using fuel flow schedules 78D, 78E and 78F respectively, which are associated with operating condition(s) 68B in FIG. 5. FIG. 6B shows the first and second start attempts as being unsuccessful. A successful light-off is indicated to occur during the third start attempt. The fuel flow rate may be controlled in an open-loop manner until the light-off is detected. Once the light-off is detected, the fuel flow rate may be controlled in a closed-loop manner.

The protocol of FIG. 6B may have generally the same characteristics as the protocol of FIG. 6A except for the profiles of fuel flow schedules 78D, 78E and 78F being different from the fuel flow schedules 78A, 78B and 78C illustrated in FIG. 6A. Fuel flow schedule 78D of the first start attempt may define an initial plateau fuel flow rate WF4 of fuel delivered to combustor 30 followed by one or more step (i.e., incremental) increases in the fuel flow rate before termination of the first start attempt. Fuel flow schedule 78E of the second start attempt may define an initial plateau fuel flow rate WF5 of fuel delivered to combustor 30 followed by one or more step (i.e., incremental) increases in the fuel flow rate before termination of the second start attempt. Similarly, fuel flow schedule 78F of the third start attempt may define an initial plateau fuel flow rate WF6 of fuel delivered to combustor 30 followed by one or more step increases in the fuel flow rate.

As shown in FIG. 6B, the fuel flow rate of fuel delivered to combustor 30 may be increased for substantially an entire subsequent start attempt following an unsuccessful start attempt. For example, initial plateau fuel flow rate WF5 of the second start attempt may be greater than initial plateau fuel flow rate WF4 of the first start attempt so that WF5>WF4. In other words, the initial plateau fuel flow rate WF4 of the first start attempt may be lower than the initial plateau fuel flow rate WF5 of the second start attempt. For example, initial plateau fuel flow rate WF5 may be increased by a fixed amount (e.g., +10 pounds per hour) or by a percentage (e.g., +5%) over initial plateau fuel flow rate WF4. Similarly, initial plateau fuel flow rate WF6 of the third start attempt may be greater than initial plateau fuel flow rate WF5 of the second start attempt so that WF6>WF5. For example, maximum fuel flow rate WF6 may be increased by a fixed amount (e.g., +11 pounds per hour) or by a percentage (e.g., +7%) over maximum fuel flow rate WF5. In various embodiments the first increase from initial plateau fuel flow rate WF4 to initial plateau fuel flow rate WF5 may be the same as or different from the second increase from initial plateau fuel flow rate WF5 to initial plateau fuel flow rate WF6.

As shown by the shape of the plot in FIG. 6A also, an average fuel flow rate of fuel delivered to combustor 30 during the second unsuccessful start attempt may be greater than an average fuel flow rate of fuel delivered to combustor 30 during the first unsuccessful start attempt. In other words, the average fuel flow rate of fuel delivered to combustor 30 during the first start attempt may be less than the average fuel flow rate of fuel delivered to combustor 30 during the second start attempt. A maximum fuel flow rate of the second start attempt may be greater than a maximum fuel flow rate of the first start attempt. Initial plateau fuel flow rate WF5 of the second start attempt may be greater than the maximum fuel flow rate achieved during the first start attempt. Similarly, initial plateau fuel flow rate WF6 of the third start attempt may be greater than the maximum fuel flow rate achieved during the second start attempt.

As represented by the area under the plot in FIG. 6B, a cumulative amount (e.g., pounds, litres, gallons, etc.) of fuel delivered to combustor 30 during the second start attempt may be greater than a cumulative amount of fuel delivered to combustor 30 during the first start attempt. In other words, the cumulative amount (e.g., pounds, litres, gallons, etc.) of fuel delivered to combustor 30 during the first start attempt may be less than the cumulative amount of fuel delivered to combustor 30 during the second start attempt.

FIG. 7 shows a table containing training data 82 used to train ML model 80 for determining one or more fuel flow schedules 78 for starting APU 12. ML model 80 may be used offline and by a computer other than controller 60 to determine fuel flow schedules 78 in the form of a look-up table that may then be used by controller 60 to select fuel flow schedule(s) 78 based on the applicable operating condition(s) 68. Alternatively, ML model 80 may be integrated into controller 60 and used by controller 60 to determine fuel flow schedules 78 or individual fuel flow rates based on the applicable operating condition(s) 68. For example, during operation of controller 60, operating condition(s) 68 may be received as input to ML model 80 and ML model 80 may determine one or more fuel flow schedule(s) 78 or specific flow rate values as an output.

ML model 80 may be constructed using ML algorithm(s) based on sample data such as training data 82, in order to make predictions or decisions without being explicitly programmed to do so. ML model 80 may be constructed using a supervised learning approach where a computer constructing ML model 80 is presented with example inputs such as operating conditions 68 and their desired outputs such as fuel flow schedules 78 corresponding to successful (and optionally also unsuccessful) APU start attempts, given by a "teacher". The goal of the supervised learning approach may be for the ML model 80 to learn a general rule that maps inputs to outputs. Training data 82 may include a set of training examples from actual start attempts of APU 12 and/or other comparable APUs. For example, training data 82 may be historical data specific to APU 12 and/or associated with other comparable APUs. In other words, ML model 80 may be trained using machine learning and historical data relating operating conditions and fuel flow rates to successful start attempts. Training data 82 may also include an indication of whether the inputs and outputs resulted in a successful or unsuccessful APU start. In some embodiments, ML model 80 may be constructed from one or more regression algorithms where outputs (e.g., fuel flow schedules 78) may include a numerical value within a range. In some embodiments, ML model 80 may be trained using machine learning and both successful and unsuccessful starting attempts from training data 82.

Using operating condition(s) 68 as input, ML model 80 may be configured to determine a fuel flow schedule 78 (e.g., fuel flow rate) to be delivered to combustor 30 to achieve a successful APU start during the first start attempt, the second start attempt and/or the third start attempt. In situations where a universal baseline fuel flow schedule 78 is always used for the first start attempt, ML model 80 may be used to determine an increase in fuel flow rate for the second start attempt in the event that the first start attempt is not successful. Such increase in fuel flow rate over the universal baseline fuel flow schedule 78 may be determined based on the response of engine 24 to the first start attempt. For example, such response may be characterized by one or more maximum engine parameters (e.g., rotation speed of compressor 28 and/or turbine 32, rotation speed of a high-pressure spool of engine 24, a temperature in the gas path of engine 24) reached and sensed during the first start attempt. Such response of engine 24 during the first start attempt may provide an indication of the ability to start engine 24 in the applicable operating condition(s) 68, and may provide guidance as to how much of an increase in fuel flow rate might be required to increase the likelihood of achieving a successful start in the second start attempt. The same approach could be used to characterize the response of engine 24 to the second start attempt and to determine a suitable fuel flow schedule 78 to use in the third start attempt in the event of an unsuccessful second start attempt.

In another approach, ML model 80 may be continuously or intermittently updated based on training data 82 from recent prior start attempts performed specifically on the same APU 12. The updating of ML model 80 may be performed by controller 60 or by a computer other than controller 60. Such update of ML model 80 may permit continuous learning to optimize one or more baseline fuel flow schedules 78A, 78D, 78G that may be used for first start attempts to improve the success rate of first start attempts. Accordingly, ML model 80 may be constructed to take into account characteristics specific to APU 12 including characteristics that may change over time. Such characteristics may include engine production scatter (e.g., tolerance stackup), specific installation, component deterioration (e.g., fuel nozzle fouling, compressor efficiency and battery degradation). The updating of ML model 80 accordingly may also reduce the chances of unsuccessful start attempts being frequently repeated at specific operating condition(s) 68.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A method for starting an aircraft auxiliary power unit (APU) including a combustion engine, the method comprising:
    performing a first start attempt on the APU when the APU is subjected to a first operating condition, the first start attempt including delivering fuel to a combustion chamber of the combustion engine at a first fuel flow rate;
    determining that the first start attempt was unsuccessful;
    terminating the first start attempt by ceasing to deliver the fuel to the combustion chamber of the combustion engine;
    determining that a difference between the first operating condition and a second operating condition to which the APU is subjected after terminating the first start attempt is below a threshold; and
    based on the determination that the difference is below the threshold, performing a second start attempt on the APU, the second start attempt including delivering the fuel to the combustion chamber of the combustion engine at a second fuel flow rate that is greater than the first fuel flow rate.

2. The method as defined in claim 1, wherein delivering the fuel to the combustion chamber during the first start attempt is controlled in an open-loop manner.

3. The method as defined in claim 1, wherein delivering the fuel to the combustion chamber during the second start attempt is controlled in an open-loop manner.

4. The method as defined in claim 1, wherein a first average fuel flow rate of the fuel delivered to the combustion chamber during the first start attempt is less than a second average fuel flow rate of the fuel delivered to the combustion chamber during the second start attempt.

5. The method as defined in claim 1, wherein a first initial plateau in the first fuel flow rate of the fuel delivered to the combustion chamber during the first start attempt is lower than a second initial plateau in the second fuel flow rate of the fuel delivered to the combustion chamber during the second start attempt.

6. The method as defined in claim 1, wherein a first cumulative amount of the fuel delivered to the combustion chamber during the first start attempt is less than a second cumulative amount of the fuel delivered to the combustion chamber during the second start attempt.

7. The method as defined in claim 1, wherein determining that the difference between the first operating condition and the second operating condition is below the threshold comprises determining that a time duration since terminating the first start attempt is less than a threshold time.

8. The method as defined in claim 7, wherein the threshold time is less than or equal to 30 seconds.

9. The method as defined in claim 1, wherein at least one of the first operating condition or the second operating condition includes an altitude of an aircraft including the APU.

10. The method as defined in claim 1, wherein at least one of the first operating condition or the second operating condition includes a temperature of an ambient environment external to an aircraft including the APU.

11. The method as defined in claim 1, wherein at least one of the first operating condition or the second operating condition includes a speed of an aircraft including the APU.

12. The method as defined in claim 1, comprising:
    determining that the second start attempt was unsuccessful;
    terminating the second start attempt by ceasing to deliver the fuel to the combustion chamber; and
    performing a third start attempt on the APU, the third start attempt including delivering the fuel to the combustion chamber at a third fuel flow rate greater than the second fuel flow rate.

13. The method as defined in claim 12, wherein performing the third start attempt is based in part on determining that a time duration since terminating the second start attempt is less than a threshold time.

14. The method as defined in claim 1, determining at least one of the first fuel flow rate or the second fuel flow rate using a machine learned model trained using historical data associated with APU start attempts.

15. The method as defined in claim 14, comprising training the model using a controller of the APU, the historical data including a prior start attempt of the APU.

16. A method for starting an aircraft auxiliary power unit (APU) including a gas turbine engine, the method comprising:
    performing a first start attempt on the APU when the APU is subjected to a first operating condition, the first start attempt including delivering a first cumulative fuel amount to a combustor of the gas turbine engine during the first start attempt;
    determining that the first start attempt was unsuccessful;
    terminating the first start attempt by ceasing to deliver the fuel to the combustor of the gas turbine engine; and
    when the first operating condition has not substantially changed from a second operating condition to which the APU is subjected after terminating the first start attempt, performing a second start attempt on the APU, the second start attempt including delivering a second cumulative fuel amount to the combustor of the gas turbine engine during the second start attempt, the second cumulative fuel amount being greater than first cumulative fuel amount.

17. The method as defined in claim 16, comprising:
determining that the second start attempt was unsuccessful; and
performing a third start attempt on the APU.

18. The method as defined in claim 16, comprising determining that the first operating condition has not substantially changed from the second operating condition by evaluating a time duration since terminating the first start attempt.

19. An aircraft auxiliary power unit (APU) comprising:
a gas turbine engine configured to provide energy exclusively for non-propulsive functions of an aircraft; and
a controller operatively connected to the gas turbine engine and configured to:
initiate a first start attempt on the gas turbine engine when the APU is subjected to a first operating condition, the first start attempt including delivering fuel to a combustor of the gas turbine engine at a first fuel flow rate;
determine that the first start attempt was unsuccessful;
terminate the first start attempt by ceasing to deliver the fuel to the combustor of the gas turbine engine;
determine that a difference between the first operating condition and a second operating condition to which the APU is subjected after terminating the first start attempt is below a threshold; and
when the difference is below the threshold, initiate a second start attempt on the APU, the second start attempt including delivering the fuel to the combustor of the gas turbine engine at a second fuel flow rate greater than the first fuel flow rate.

20. The APU as defined in claim 19, wherein the controller includes a model trained using machine learning and historical data relating operating conditions and fuel flow rates to APU start attempts.

* * * * *